Sept. 22, 1953      D. A. NOVAK      2,653,048
FISH HOLDER
Filed Feb. 13, 1950
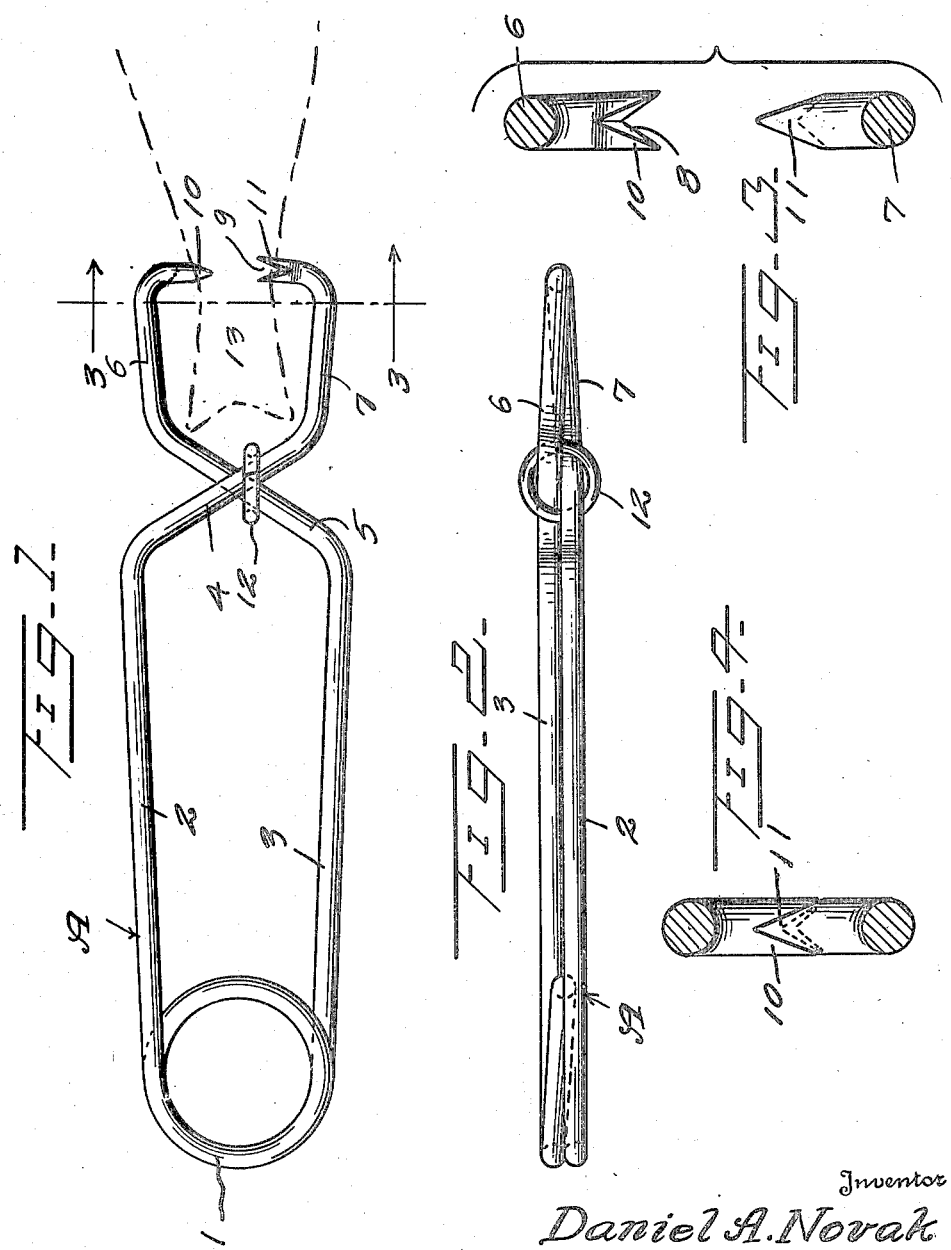
Inventor
Daniel A. Novak Patented Sept. 22, 1953

2,653,048

UNITED STATES PATENT OFFICE 2,653,048

FISH HOLDER

Daniel A. Novak, Calmar, Iowa

Application February 13, 1950, Serial No. 143,873

1 Claim. (Cl. 294—99)

This invention relates to new and useful improvements in fish holders.

The primary object of my invention is to provide an implement of this character whereby an entire fish may be completely cleaned without touching the fish with the hands.

A further object of my invention is to provide a fish holder that may be made from a single piece of steel wire, and is very economical in construction, highly efficient in operation and durable in use.

A still further object of my invention is to provide a fish holder in which the jaws will remain closed without constantly applying pressure to the handles.

With the foregoing and other objects in view that will appear as the nature of my invention is better understood, the same consists in the novel features of construction, combination and arrangement of parts illustrated in the accompanying drawings and more particularly pointed out in the appended claim.

In the accompanying drawings, which are for illustrative purposes only and are therefore not drawn to scale:

Figure 1 is a side elevation, illustrating the application of my invention.

Figure 2 is an edge view.

Figure 3 is an enlarged vertical transverse section, taken on line 3—3 of Figure 1, and Figure 4 is a detail view of the jaws when closed.

Referring to the drawings for a more particular description of my invention, and in which drawings like parts are designated by like reference characters throughout the several views, A designates my novel fish holder, as a whole, which is constructed from a single continuous piece of steel wire bent intermediate its ends to form the coil 1, then extended to form the two corresponding straight vertically spaced forwardly diverging handles 2 and 3, respectively. The handles 2 and 3 are bent in opposite directions at their forward ends, at an angle of approximately forty-five degrees, to form the straight intersecting portions 4 and 5, while the outer ends of said intersecting portions extend forwardly to form the upper and lower outwardly diverging jaws 6 and 7. As shown, the jaws 6 and 7 are formed with V-shaped notches or recesses 8 and 9, respectively, disposed in planes extending at right angles to each other, and resulting in the formation of pairs of laterally spaced beveled teeth 10 and 11 which seat in corresponding recesses when the jaws are closed, as illustrated in Figure 4 of the drawings.

A ring 12 encircles the intersecting portions 4 and 5 of the handles to prevent lateral displacement or spreading of the latter and maintain the jaws and teeth in alignment.

In practice, the teeth 10 and 11 are clamped into opposite sides of and partially penetrate the tail, as 13, of the fish, preparatory to scaling the fish. The fish is then cut open and one side of the fish held by the teeth of the implement to facilitate the removal of the entrails. My holder is also useful in holding the fins of the fish while severing the former.

Particular attention is invited to the fact that my novel fish holder will remain closed without constantly gripping and applying pressure to the handles and will not slip when in use by virtue of the form and arrangement of the teeth 10 and 11.

My holder is also useful in landing fish from the water. When the implement is once clamped on the fish, it will not become loose until the jaws are opened and released by exerting pressure on the handles.

From the foregoing description taken in connection with the drawings, it is thought that the construction, operation and advantages of my invention, will be readily understood without requiring a more extended explanation.

Having described my invention, what I claim as new and desire to secure by Letters Patent, is:

A fish holder of the character specified, constructed from a single continuous piece of steel wire first bent intermediate its ends to form a coil, and then extended forwardly to form a pair of corresponding straight outwardly diverging handles, with the front ends of said handles bent in opposite directions at an angle of approximately forty-five degrees to form intersecting portions whose outer ends are extended forwardly to provide oppositely disposed outwardly diverging jaws, said jaws formed with V-shaped notches extending in planes disposed at right angles to each other and each provided with pairs of beveled teeth adapted to seat in corresponding notches of the opposing jaw when the jaws are closed, and a ring encircling said intersecting portions to prevent lateral displacement or spreading of the handles and jaws.

DANIEL A. NOVAK.

References Cited in the file of this patent

UNITED STATES PATENTS

| Number | Name | Date |
|---|---|---|
| 426,464 | McDonough, Sr. | Apr. 29, 1890 |
| 781,174 | Bangley | Jan. 31, 1905 |
| 1,594,792 | Mortimer | Aug. 3, 1926 |
| 1,981,491 | Wolfe | Nov. 20, 1934 |
| 2,486,496 | Romazon | Nov. 1, 1949 |
| 2,522,243 | Wieland | Sept. 12, 1950 |